US011988448B1

(12) United States Patent
Yang et al.

(10) Patent No.: US 11,988,448 B1
(45) Date of Patent: May 21, 2024

(54) MINERAL POWDER PELLET DRYING DEVICE

(71) Applicant: North China University of Science and Technology, Hebei (CN)

(72) Inventors: Aimin Yang, Hebei (CN); Yunjie Bai, Hebei (CN); Chengcheng Li, Hebei (CN); Weining Ma, Hebei (CN); Fuxing Yu, Hebei (CN)

(73) Assignee: North China University of Science and Technology, Tangshan (CN)

( * ) Notice: Subject to any disclaimer, the term of this patent is extended or adjusted under 35 U.S.C. 154(b) by 0 days.

(21) Appl. No.: 18/541,939

(22) Filed: Dec. 15, 2023

Related U.S. Application Data

(63) Continuation of application No. PCT/CN2023/104990, filed on Jul. 19, 2023.

(30) Foreign Application Priority Data

May 17, 2023 (CN) .......................... 202310552104.2

(51) Int. Cl.
*F26B 25/00* (2006.01)
*F26B 3/04* (2006.01)

(52) U.S. Cl.
CPC .............. *F26B 25/002* (2013.01); *F26B 3/04* (2013.01); *F26B 2200/08* (2013.01)

(58) Field of Classification Search
CPC ...... F26B 25/002; F26B 3/04; F26B 2200/08; F26B 25/08
USPC ........................................................... 34/168
See application file for complete search history.

(56) References Cited

U.S. PATENT DOCUMENTS

| | | | | |
|---|---|---|---|---|
| 1,489,223 A * | 4/1924 | Reumann | ................ | F26B 21/02 34/103 |
| 3,456,357 A * | 7/1969 | Griffith | ................ | F26B 25/009 34/493 |
| 4,704,806 A * | 11/1987 | Gresens | ................ | F26B 25/225 34/570 |
| 5,724,751 A * | 3/1998 | Ellingsen | .................. | F26B 7/00 34/59 |
| 6,618,956 B1 * | 9/2003 | Schilp | ....................... | F26B 3/12 34/139 |
| 8,276,289 B2 * | 10/2012 | Causer | .................... | F23G 5/027 202/95 |

(Continued)

FOREIGN PATENT DOCUMENTS

| | | |
|---|---|---|
| CN | 213208440 U | 5/2021 |
| CN | 215002793 U | 12/2021 |

(Continued)

*Primary Examiner* — Stephen M Gravini

(57) ABSTRACT

The present disclosure relates to the technical field of mineral powder processing, and provides a mineral powder pellet drying device, the device includes a drying box body and a material preparation trough, and shunting buffer assemblies are configured to withstand the impact of falling mineral powder pellets in an elastically concave mode and guide the mineral powder pellets to two sides for dispersion. The device in the present disclosure has a simple structure, and is capable of buffering the impact strength of the falling mineral powder pellets, so that the breakage of the mineral powder pellets caused by a fast falling speed is avoided, therefore, the device in the present disclosure has a better drying effect and is highly applicable.

8 Claims, 2 Drawing Sheets

(56) References Cited

U.S. PATENT DOCUMENTS

| | | | |
|---|---|---|---|
| 9,421,587 B2 * | 8/2016 | Matsui | F26B 5/16 |
| 2022/0192465 A1 * | 6/2022 | Lee | B01D 53/265 |
| 2023/0296318 A1 * | 9/2023 | Straetmans | F26B 15/122 |
| | | | 34/218 |

FOREIGN PATENT DOCUMENTS

| | | | | | |
|---|---|---|---|---|---|
| CN | 114576972 A | | 6/2022 | | |
| CN | 115218638 A | | 10/2022 | | |
| EP | 92777 A | * | 11/1983 | | F26B 25/002 |
| GB | 765912 A | | 1/1957 | | |
| GB | 868675 A | | 5/1961 | | |
| JP | 2020131142 A | * | 8/2020 | | B03C 5/00 |
| WO | WO-2006075920 A | * | 2/2006 | | A01C 3/00 |

* cited by examiner

MINERAL POWDER PELLET DRYING DEVICE

CROSS-REFERENCE TO RELATED APPLICATIONS

This application is a continuation of PCT/CN2023/104990, filed Jul. 19, 2023 and claims priority of Chinese Patent Application No. 202310552104.2, filed on May 17, 2023, the entire contents of which are incorporated herein by reference.

TECHNICAL FIELD

The present disclosure relates to the technical field of mineral powder processing, in particular to a mineral powder pellet drying device.

BACKGROUND

Mineral powder, also known as water-quenched blast furnace slag, is high-fineness and high-activity powder obtained from water quenched blast furnace slags after being dried, ground and the like, which is a high-quality concrete admixture and cement admixture, and is also an important material recognized in the world today for the preparation of high performance concrete. The use of granulated blast furnace slag powder can effectively improve the compressive strength of concrete, and reduce the cost of concrete. Pellets are artificial lump ore and are fine materials for alloy production and smelting; and the pellet production process involves batching, pelletizing and drying. When various raw materials and binders of the pellets are mixed in a stirring device, a proper amount of water needs to be added to the raw materials and the binders, which are then pressed and formed by a pellet press to form wet pellets.

Upon completion of the production, mineral powder pellets need to be dried. In the prior art, the mineral powder pellets are dried using a pellet drying device; a drying method of the mineral powder pellets is as follows: rolling or turning over the mineral powder pellets on an inclined plate, guiding hot air flow to the mineral powder pellets, evaporating water in the mineral powder pellets and making the water being taken away by the hot air flow; since the mineral powder pellets are rolled on the inclined plate in a concentrated manner, the contact between the hot air flow and the mineral powder pellets is effectively affected, so that the drying effect is according affected. Furthermore, the mineral powder pellets keep a rolling state through the process, the mineral powder pellets, when falling to a bottom, generate a relatively great potential energy impact, making them easy to collide with the drying device and accordingly become broken.

SUMMARY

An objective of the present disclosure to provide a mineral powder pellet drying device to solve the problems mentioned in the background art.

The present disclosure provides a mineral powder pellet drying device, including a drying box body and a material preparation trough arranged at the top end port of the drying box body, and a feeding port being formed on the bottom wall of the material preparation trough; and further including a plurality of rows of shunting buffer assemblies, a plurality of rows of anti-breakage assemblies and a driving assembly arranged on an outer wall of the drying box body; the shunting buffer assemblies and the anti-breakage assemblies are both arranged inside the drying box body, and the plurality of rows of shunting buffer assemblies and the plurality of rows of anti-breakage assemblies are alternately distributed from the top to the bottom of the drying box body;

each of the anti-breakage assemblies includes a central rod shaft, an adjusting rod and two anti-falling plates with elastic pads on surfaces thereof;

two ends of the central rod shaft are fixedly connected with inner walls of the drying box body, and the two anti-falling plates are respectively positioned at two sides of the central rod shaft and are in rotating fit with the central rod shaft;

one end of the adjusting rod penetrates through a side wall of the drying box body in a sliding manner and side portions of the adjusting rod are respectively connected with the two anti-falling plates through a push-pull connecting rod in a movable manner;

when the adjusting rod slides on the side wall of the drying box body in an axial direction of the adjusting rod, the two anti-falling plates through the push-pull connecting rod can be driven to swing synchronously in opposite directions;

the driving assembly is disposed on the side wall of the drying box body, the driving assembly is connected with the adjusting rods of the plurality of rows of anti-breakage assemblies, and the driving assembly is configured to drive a plurality of the adjusting rods to synchronously slide on the side wall of the drying box body;

each row of the shunting buffer assemblies are linearly distributed at equal intervals, and the shunting buffer assemblies are configured to withstand the impact of falling mineral powder pellets in an elastically concave mode and guide the mineral powder pellets to two sides for dispersion; and the side wall of the drying box body is further provided with a hot air blower assembly for introducing hot air flow to the inside of the drying box body.

Further, the driving assembly includes a power component and a plurality of external push rod members with the quantity same as that of the rows of the anti-breakage assemblies;

the external push rod members are arranged at a lateral part of the drying box body and correspond to one of the rows of the anti-breakage assemblies, and side portions of the external push rod members are fixedly connected with end portions of the plurality of adjusting rods of the corresponding anti-breakage assemblies; and the power component is arranged at the lateral part of the drying box body and is connected with the plurality of external push rod members; and the power component is configured to drive the plurality of external push rod members to move synchronously in the axial direction of the adjusting rods.

Further, the driving assembly includes a power motor, a power turntable and a power rod;

the power motor is disposed on the side wall of the drying box body, and the power turntable is disposed on an output end of the power motor;

the power rod is located on one side of an end face of the power turntable, an eccentric power column is disposed on the end face of the power turntable, and the eccentric power column extends into the inside of a strip-shaped hole formed on the power rod; and a guiding hole is formed on the power rod and a guiding rod passing through the guiding hole is disposed on the side wall of the drying box body, the power rod is further connected with end portions of the plurality of external push rod members, and the movable power rod can drive the external push rod members to move along an axis of the adjusting rods.

Further, a side portion of the power rod has an outer extension portion, and two clamping rod members are disposed on the outer extension portion; and each clamping rod member has a clamping roller rotatably connected thereto, one end of each of the external push rod members has an inclined portion, and a plurality of the inclined portions all pass between the two clamping rod members.

Further, a sealing member is disposed on an end face of the material preparation trough facing the inside of the drying box body;

the sealing member includes a baffle plate, a through-flow orifice and an outer connecting rod; and the baffle plate is in sliding fit with the end surface of the material preparation trough and can cover the feeding port, the through-flow orifice is formed on the baffle plate, one end of the outer connecting rod is connected with the baffle plate, and the other end of the outer connecting rod passes through the side wall of the drying box body and is connected with the power rod.

Further, each of the shunting buffer assembly includes a supporting mesh member, fixing rods and a rebound supporting member;

the supporting mesh member is in arc shape, two fixing rods are provided and respectively disposed at two sides of the supporting mesh member, and end portions of the fixing rods are fixedly connected with the inner walls of the drying box body;

the rebound supporting member is disposed on a lower side of the supporting mesh member and includes a lower fixing seat, a supporting cylinder and a supporting rod; and an end portion of the lower fixing seat is fixedly connected with the inner wall of the drying box body, the top end of the supporting rod is fixedly connected with an inner wall of the supporting mesh member, the supporting cylinder is disposed on the lower fixing seat and a lower end of the supporting rod extends into the inside of the supporting cylinder, and the lower end of the supporting rod is connected with an inner wall of the supporting cylinder through a supporting spring.

Further, a partition member is further disposed inside the drying box body, and the partition member divides the drying box body into a heat exchange cavity and a drying cavity;

an exhaust vent that communicates the heat exchange cavity with the drying cavity is formed in the bottom of the partition member;

the hot air blower assembly includes an air blower, a heating member and a heat exchange air duct;

the air blower is disposed on an outer wall of the drying box body, and the heating member is disposed on the inner wall of the partition member facing the drying cavity; and an air outlet end of the air blower is communicated with the heating member through the heat exchange air duct, and the heat exchange air duct passes through the heat exchange cavity and can exchange heat with the inside of the heat exchange cavity.

Further, air guide holes that communicate the heat exchange cavity with the inside of the material preparation trough are formed on the material preparation trough, and a drying agent located at the exhaust vent is placed inside the heat exchange cavity.

Beneficial Effects

1. The plurality of rows of shunting buffer assemblies and the plurality of rows of anti-breakage assemblies in the present disclosure are capable of guiding the mineral powder pellets to fall in a dispersed curved trajectory and gradually buffering the potential energy impact of the falling mineral powder pellets. Compared with concentrated rolling on the inclined plane, the travel and time of the mineral powder pellets inside the drying box body are increased, the contact between the mineral powder pellets and hot air flow is improved, and the drying effect is accordingly improved.

2. The anti-falling plates of the anti-breakage assemblies in the present disclosure can swing, so that the gap between the two anti-breakage assemblies can be engaged, the impact strength of the falling mineral powder pellets can be effectively reduced, the breakage caused by collision between the mineral powder pellets and the bottom wall of the drying box body is avoided, the swinging anti-falling plates can make the air flow inside the drying box body turbulent, and the drying effect is accordingly improved.

3. The device in the present disclosure has a simple structure, and is capable of buffering the impact strength of the falling mineral powder pellets, so that the breakage of the mineral powder pellets caused by a fast falling speed is avoided, therefore, the device in the present disclosure has a better drying effect and is highly applicable.

Figure 1:
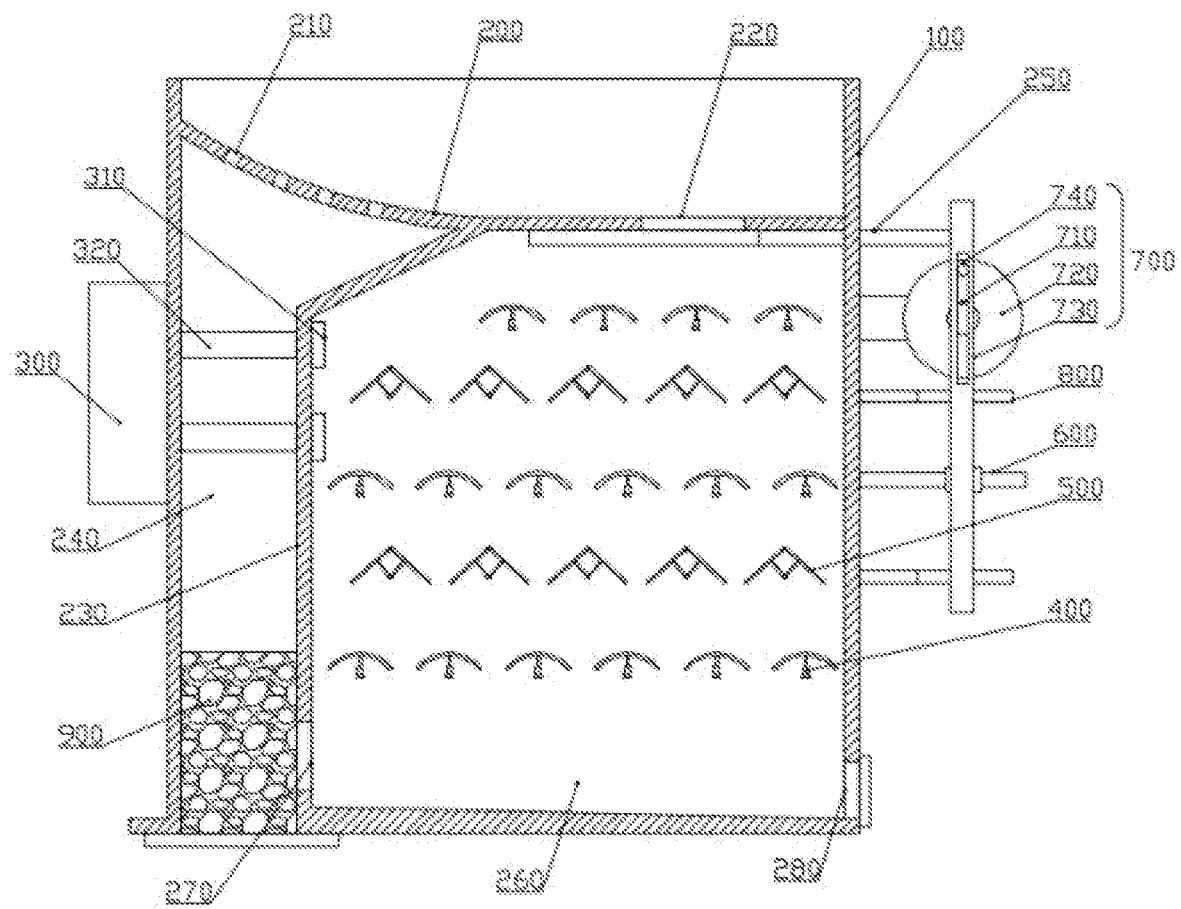
FIG. 1 is a schematic diagram of an overall structure of an embodiment of a mineral powder pellet drying device according to the present disclosure.

Reference numerals and denotations thereof: drying box body 100; material preparation trough 200; air guide hole 210; feeding port 220; partition member 230; heat exchange cavity 240; sealing member 250; baffle plate 251; through-flow orifice 252; outer connecting rod 253; drying cavity 260; exhaust vent 270; discharge port 280; air blower 300; heating member 310; heat exchange air duct 320; shunting buffer assembly 400; supporting mesh member 410; fixing rods 420; lower fixing seat 430; supporting cylinder 440; supporting rod 450; supporting spring 460; anti-breakage assembly 500; central rod shaft 510; anti-falling plate 520; adjusting rod 530; push-pull connecting rod 540; guiding rod 600; power component 700; power motor 710; power turntable 720; power rod 730; guiding hole 731; outer extension portion 732; clamping rod member 733; clamping roller 734; eccentric power column 740; external push rod member 800; inclined portion 810; and drying agent 900.

DETAILED DESCRIPTION

Figure 2:
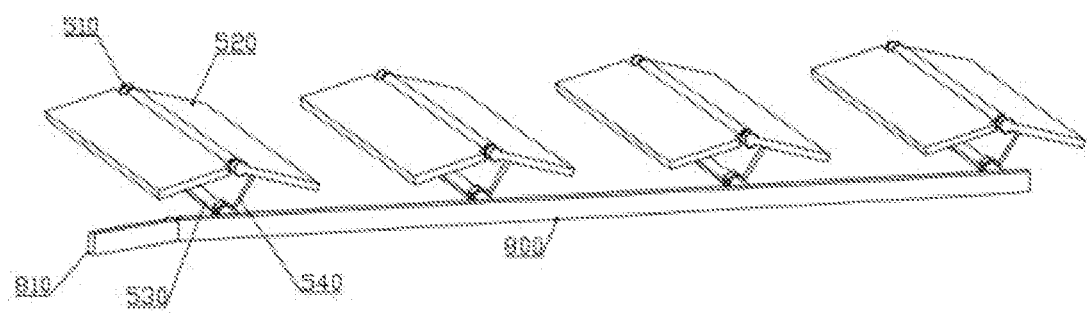
FIG. 2 is a structural schematic diagram of an anti-breakage assembly of an embodiment according to the present disclosure.

In one embodiment, as shown in FIGS. 1 and 2, a mineral powder pellet drying device is provided, the device includes a drying box body 100 and a material preparation trough 200 arranged at the top end port of the drying box body 100, and a feeding port 220 is formed on the bottom wall of the material preparation trough 200; the device further includes a plurality of rows of shunting buffer assemblies 400, a plurality of rows of anti-breakage assemblies 500 and a driving assembly arranged on an outer wall of the drying box body 100, where the shunting buffer assemblies 400 and the anti-breakage assemblies 500 are both arranged inside the drying box body 100, and the plurality of rows of shunting buffer assemblies 400 and the plurality of rows of anti-breakage assemblies 500 are alternately distributed from the top to the bottom of the drying box body 100; each of the anti-breakage assemblies 500 includes a central rod shaft 510, an adjusting rod 530 and two anti-falling plates 520 with elastic pads on surfaces thereof, where two ends of the central rod shaft 510 are fixedly connected with inner walls of the drying box body 100, the two anti-falling plates 520 are respectively positioned at two sides of the central rod shaft 510 and are in rotating fit with the central rod shaft 510, one end of the adjusting rod 530 penetrates through a side wall of the drying box body 100 in a sliding manner, side portions of the adjusting rod 530 are respectively connected with the two anti-falling plates 520 through a push-pull connecting rod 540 in a movable manner, and when the adjusting rod 530 slides on the side wall of the drying box body 100 in an axial direction of the adjusting rod, the two anti-falling plates 520 can be driven through the push-pull connecting rod 540 to swing synchronously in opposite directions; the driving assembly is disposed on the side wall of the drying box body 100, the driving assembly is connected with the adjusting rods 530 of the plurality of rows of anti-breakage assemblies 500, and the driving assembly is configured to driving a plurality of the adjusting rods 530 to synchronously slide on the side wall of the drying box body 100; and each row of the shunting buffer assemblies 400 are linearly distributed at equal intervals, the shunting buffer assemblies 400 are configured to withstand the impact of falling mineral powder pellets in an elastically concave mode and guide the mineral powder pellets to two sides for dispersion, and the side wall of the drying box body 100 is further provided with a hot air blower assembly for introducing hot air flow to the inside of the drying box body 100.

In the embodiment of the present disclosure, the material preparation trough 200 is configured to accommodate undried mineral powder pellets, the mineral powder pellets fall to the inside of the drying box body 100 through the feeding port 220, the mineral powder pellets inside the drying box body 100 fall in a dispersed curved trajectory under the guidance of the plurality of rows of shunting buffer assemblies 400 and the plurality of rows of anti-breakage assemblies 500, and compared with a straight-line falling mode, a curve falling mode increases the travel and time of the mineral powder pellets inside the drying box body 100, so that the drying effect is improved; the hot air blower assembly introduces the hot air flow to the inside of the drying box body 100, and air flow circulation speed and temperature inside the drying box body 100 are increased, so that the drying effect of the mineral powder pellet are further improved; in the process that the mineral powder pellets fall to the inside of the drying box body 100, the driving assembly drives the adjusting rods 530 of the plurality of rows of anti-breakage assemblies 500 to reciprocally move in an axis direction of the adjusting rods, so that the adjusting rods 530 can drive the two anti-falling plates 520 to swing synchronously in opposite directions around an axis of the central rod shaft 510 through the push-pull connecting rod 540; when the two anti-falling plates 520 are unfolded, a gap between the two adjacent anti-breakage assemblies 500 is reduced, and the mineral powder pellets will be stuck in the gap between the two anti-breakage assemblies 500, so that the mineral powder pellets are prevented from continuously moving downwards; when the two anti-falling plates 520 are brought together, the gap between the two adjacent anti-breakage assemblies 500 is increased, and the mineral powder pellets will continuously move downwards, so that falling speed and impact force of the mineral powder pellets are relatively reduced, and the mineral powder pellets are prevented from being broken due to strong impact force when they move downwards to the bottom of the drying box body 100; and further, the reciprocating swing of the two anti-breakage assemblies 500 can disturb the flow of air flow inside the drying box body 100, so that a contact surface between the air flow and the mineral powder pellets is increased, and the drying effect is accordingly improved. Further, a discharge port 280 is formed on a side wall at the bottom of the drying box body 100.

Figure 3:
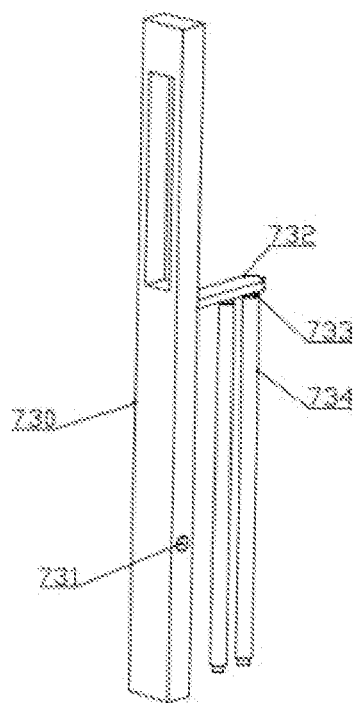
FIG. 3 is a structural schematic diagram of a power rod of an embodiment according to the present disclosure.

In one embodiment, as shown in FIGS. 1-3, the driving assembly includes a power component 700 and a plurality of external push rod members 800 with the quantity same as that of the rows of the anti-breakage assemblies 500, the external push rod members 800 are arranged at a lateral part of the drying box body 100 and correspond to one of the rows of the anti-breakage assemblies 500, side portions of the external push rod members 800 are fixedly connected with end portions of the plurality of adjusting rods 530 of the corresponding anti-breakage assemblies 500, and the power component 700 is arranged at the lateral part of the drying box body 100 and is connected with the plurality of external push rod members 800; and the power component 700 is configured to drive the plurality of external push rod members 800 to move synchronously in the axial direction of the adjusting rods 530. In the embodiment of the present disclosure, the power component 700 drives the plurality of adjusting rods 530 to axially move through the external push rod members 800, so that the anti-falling plates 520 the plurality of rows of anti-breakage assemblies 500 swing synchronously, and the impact of falling mineral powder pellets is accordingly reduced.

In one embodiment, as shown in FIGS. 1-3, the power component 700 includes a power motor 710, a power turntable 720 and a power rod 730, where the power motor 710 is disposed on the side wall of the drying box body 100, the power turntable 720 is disposed on an output end of the power motor 710, the power rod 730 is located on one side of an end face of the power turntable 720, an eccentric power column 740 is disposed on the end face of the power turntable 720 and the eccentric power column 740 extends into the inside of a strip-shaped hole formed on the power rod 730, a guiding hole 731 is formed on the power rod 730 and a guiding rod 600 passing through the guiding hole 731 is disposed on the side wall of the drying box body 100, the power rod 730 is further connected with end portions of the plurality of external push rod members 800, and the movable power rod 730 can drive the external push rod members 800 to move along an axis of the adjusting rods 530; in the embodiment of the present disclosure, a position of the eccentric power column 740 on the power turntable 720 can be adjusted according to extent of movement of the external push rod members 800, that is, a distance between the eccentric power column 740 and the center of the power turntable 720 is adjusted; the power motor 710 drives the power turntable 720 to rotate, the eccentric power column 740 rotates along with the power turntable 720, and the rotating eccentric power column 740 can drive the power rod 730 to reciprocate; and the reciprocating power rod 730 can drive the external push rod members 800 to reciprocate along the axis of the adjusting rod 530.

In one embodiment, as shown in FIGS. 1-3, a side portion of the power rod 730 has an outer extension portion 732 and two clamping rod members 733 are disposed on the outer extension portion 732, each clamping rod member 733 has a clamping roller 734 rotatably connected thereto, one end of each of the external push rod members 800 has an inclined portion 810, and a plurality of the inclined portions 810 all pass between the two clamping rod members 733; and in the embodiment of the present disclosure, under the driving of the power turntable 720 and the eccentric power column 740, the power rod 730 moves reciprocally along a length direction of the external push rod members 800, the inclined portions 810 pass between the two clamping rod members 733, and the two clamping rod members 733 move along with the power rod 730, so that the clamping rod members 733 can drive the two inclined portions 810 to move in a direction away from the drying box body 100 or approach the drying box body 100.

Figure 5:
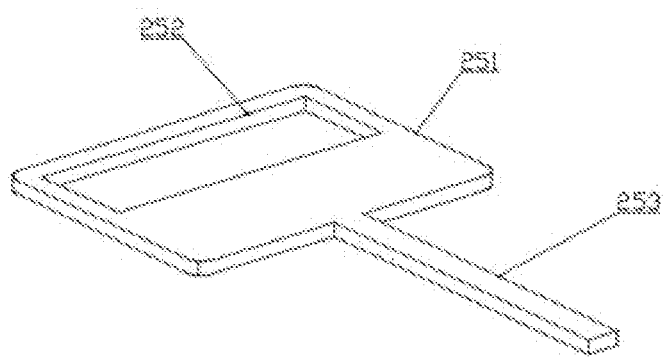
FIG. 5 is a structural schematic diagram of a sealing member of an embodiment according to the present disclosure.

In one embodiment, as shown in FIGS. 1 and 5, a sealing member 250 is disposed on an end face of the material preparation trough 200 facing the inside of the drying box body 100, where the sealing member 250 includes a baffle plate 251, a through-flow orifice 252 and an outer connecting rod 253, the baffle plate 251 is in sliding fit with the end surface of the material preparation trough 200 and can cover the feeding port 220, the through-flow orifice 252 is formed on the baffle plate 251, one end of the outer connecting rod 253 is connected with the baffle plate 251, and the other end of the outer connecting rod passes through the side wall of the drying box body 100 and is connected with the power rod 730; and in the embodiment of the present disclosure, the reciprocating power rod 730 can drive the outer connecting rod 253 and the baffle plate 251 to move reciprocally, the mineral powder pellets in the material preparation trough 200 can pass through the feeding port 220 quickly when the through-flow orifice 252 is aligned with the feeding port 220, and the baffle plate 251 can prevent the mineral powder pellets from passing through the feeding port 220 when the through-flow orifice 252 is misaligned with the feeding port 220, so that the mineral powder pellets intermittently enter the inside of the drying box body 100 for drying, and the mutual collision caused by the excessively concentrated falling of the mineral powder pellets is accordingly avoided.

Figure 4:
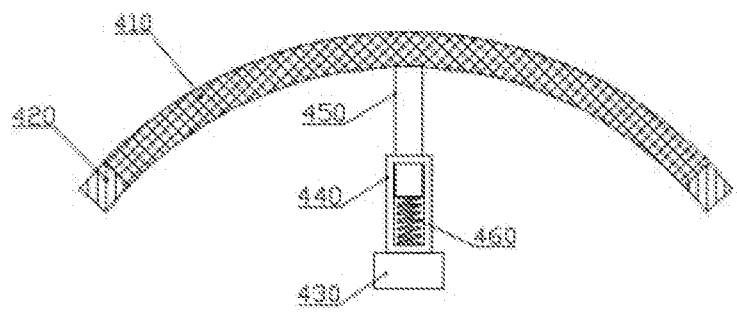
FIG. 4 is a structural schematic diagram of a shunting buffer assembly of an embodiment according to the present disclosure.

In one embodiment, as shown in FIGS. 1 and 4, each of the shunting buffer assemblies 400 includes a supporting mesh member 410, fixing rods 420 and a rebound supporting member, where the supporting mesh member 410 is in arc shape, two fixing rods 420 are provided and respectively disposed at two sides of the supporting mesh member 410, end portions of the fixing rods 420 are fixedly connected with the inner walls of the drying box body 100, the rebound supporting member is disposed on a lower side of the supporting mesh member 410 and includes a lower fixing seat 430, a supporting cylinder 440 and a supporting rod 450, an end portion of the lower fixing seat 430 is fixedly connected with the inner wall of the drying box body 100, the top end of the supporting rod 450 is fixedly connected with an inner wall of the supporting mesh member 410, the supporting cylinder 440 is disposed on the lower fixing seat 430 and a lower end of the supporting rod 450 extends into the inside of the supporting cylinder 440, and the lower end of the supporting rod 450 is connected with an inner wall of the supporting cylinder 440 through a supporting spring 460; and in the embodiment of the present disclosure, when the mineral powder pellets fall onto the supporting mesh member 410, the shunting buffer assemblies 400 can buffer the impact of the falling mineral powder pellets due to the elasticity of the supporting mesh member 410 and through the elastic action of the supporting spring 460, and when the mineral powder pellets fall along the arc surface of the supporting mesh member 410, the supporting mesh member 410 is restored to its original shape under the rebound force of the supporting spring 460, so that the impact of the next batch of falling mineral powder pellets can be buffered.

In one embodiment, as shown in FIG. 1, a partition member 230 is further disposed inside the drying box body 100, the partition member 230 divides the drying box body 100 into a heat exchange cavity 240 and a drying cavity 260, an exhaust vent 270 that communicates the heat exchange cavity 240 with the drying cavity 260 is formed in the bottom of the partition member 230, where the hot air blower assembly includes an air blower 300, a heating member 310 and a heat exchange air duct 320, the air blower 300 is disposed on an outer wall of the drying box body 100, the heating member 310 is disposed on an inner wall of the partition member 230 facing the drying cavity 260, an air outlet end of the air blower 300 is communicated with the heating member 310 through the heat exchange air duct 320, and the heat exchange air duct 320 passes through the heat exchange cavity 240 and can exchange heat with the inside of the heat exchange cavity 240; in the embodiment of the present disclosure, the air flow introduced into the inside of drying cavity 260 by the air blower 300 through the heat exchange air duct 320 is heated by the heating member 310, and the heated air flow then dries the falling mineral powder pellets inside the drying cavity 260; and the air flow inside the drying cavity 260 flows to the heat exchange cavity 240 through the exhaust vent 270, so that the air flow flowing inside the heat exchange air duct 320 can exchange heat with the air flow inside the heat exchange cavity 240, the air flow inside the heat exchange air duct 320 can be preheated, and a heat utilization rate can be improved accordingly.

In one embodiment, as shown in FIG. 1, air guide holes 210 that communicate the heat exchange cavity 240 with the inside of the material preparation trough 200 are formed on the material preparation trough 200, and a drying agent 900 located at the exhaust vent 270 is placed inside the heat exchange cavity 240; in the embodiment of the present disclosure, under the action of the drying agent 900, the air flow entering the heat exchange cavity 240 through the exhaust vent 270 can remove moisture, and the air flow inside the heat exchange cavity 240 is introduced into the material preparation trough 200 through the air guide holes 210, so that the mineral powder pellets in the material preparation trough 200 are pre-dried, and the subsequent drying efficiency is accordingly improved.

The above embodiment provides a mineral powder pellet drying device, where the mineral powder pellets fall to the inside of the drying box body 100 through the feeding port 220, the mineral powder pellets inside the drying box body 100 fall in a curved trajectory under the guidance of the plurality of rows of shunting buffer assemblies 400 and the plurality of rows of anti-breakage assemblies 500, and compared with a straight-line falling mode, a curve falling mode increases the travel and time of the mineral powder pellets inside the drying box body 100, so that the drying effect is improved; the hot air blower assembly introduces the hot air flow to the inside of the drying box body 100, and air flow circulation speed and temperature inside the drying box body 100 are increased, so that the drying effect of the mineral powder pellet are further improved; in the process that the mineral powder pellets fall to the inside of the drying box body 100, the driving assembly drives the adjusting rods 530 of the plurality of rows of anti-breakage assemblies 500 to reciprocally move in the axis direction of the adjusting rods, so that the adjusting rods 530 can drive the two anti-falling plates 520 to swing synchronously in opposite directions around an axis of the central rod shaft 510 through the push-pull connecting rod 540; when the two anti-falling plates 520 are unfolded, a gap between the two adjacent anti-breakage assemblies 500 is reduced, and the mineral powder pellets will be stuck in the gap between the two anti-breakage assemblies 500, so that the mineral powder pellets are prevented from continuously moving downwards; when the two anti-falling plates 520 are brought together, the gap between the two adjacent anti-breakage assemblies 500 is increased, and the mineral powder pellets will continuously move downwards, so that falling speed and impact force of the mineral powder pellets are relatively reduced, and the mineral powder pellets are prevented from being broken due to strong impact force when they move downwards to the bottom of the drying box body 100; and further, the reciprocating swing of the two anti-breakage assemblies 500 can disturb the flow of air flow inside the drying box body 100, so that a contact surface between the air flow and the mineral powder pellets is increased, and the drying effect is accordingly improved.

The foregoing descriptions are merely specific implementations of the present disclosure, and the scope of the present disclosure is not limited thereto. Any variation or replacement made by persons skilled in the art within the technical scope disclosed in the present disclosure shall fall within the protection scope of the present disclosure. Therefore, the scope of protection of the present disclosure shall be subject to the protection scope of the claims.

INDUSTRIAL APPLICABILITY

The technical solution in the present disclosure is capable of increasing the travel and time of the mineral powder pellets inside the drying box body, improving the contact between the mineral powder pellets and hot air flow and buffering the impact strength of the falling mineral powder pellets, therefore, the present disclosure is highly applicable.

What is claimed is:

1. A mineral powder pellet drying device, comprising a drying box body and a material preparation trough arranged at a top end port of the drying box body, and a feeding port being formed on a bottom wall of the material preparation trough; and further comprising a plurality of rows of shunting buffer assemblies, a plurality of rows of anti-breakage assemblies and a driving assembly arranged on an outer wall of the drying box body;
   the shunting buffer assemblies and the anti-breakage assemblies are both arranged inside the drying box body, and the plurality of rows of shunting buffer assemblies and the plurality of rows of anti-breakage assemblies are alternately distributed from a top to a bottom of the drying box body;
   each of the anti-breakage assemblies comprises a central rod shaft, an adjusting rod and two anti-falling plates with elastic pads on surfaces thereof;
   two ends of the central rod shaft are fixedly connected with inner walls of the drying box body, and the two anti-falling plates are respectively positioned at two sides of the central rod shaft and are in rotating fit with the central rod shaft;
   one end of the adjusting rod penetrates through a side wall of the drying box body in a sliding manner and side portions of the adjusting rod are respectively connected with the two anti-falling plates through a push-pull connecting rod in a movable manner;
   when the adjusting rod slides on the side wall of the drying box body in an axial direction of the adjusting rod, the two anti-falling plates through the push-pull connecting rod can be driven to swing synchronously in opposite directions;
   the driving assembly is disposed on the side wall of the drying box body, the driving assembly is connected with adjusting rods of the plurality of rows of anti-breakage assemblies, and the driving assembly is configured to drive a plurality of the adjusting rods to synchronously slide on the side wall of the drying box body;
   each row of the shunting buffer assemblies are linearly distributed at equal intervals, and the shunting buffer assemblies are configured to withstand impact of falling mineral powder pellets in an elastically concave mode and guide the mineral powder pellets to two sides for dispersion; and the side wall of the drying box body is further provided with a hot air blower assembly for introducing hot air flow to an inside of the drying box body.

2. The mineral powder pellet drying device according to claim 1, wherein the driving assembly comprises a power component and a plurality of external push rod members with a quantity same as that of the rows of the anti-breakage assemblies;
   the external push rod members are arranged at a lateral part of the drying box body and correspond to one of the rows of the anti-breakage assemblies, and side portions of the external push rod members are fixedly connected with end portions of the plurality of adjusting rods of the corresponding anti-breakage assemblies; and
   the power component is arranged at a lateral part of the drying box body and is connected with the plurality of external push rod members; and the power component is configured to drive the plurality of external push rod members to move synchronously in the axial direction of the adjusting rods.

3. The mineral powder pellet drying device according to claim 2, wherein the driving assembly comprises a power motor, a power turntable and a power rod;
   the power motor is disposed on the side wall of the drying box body, and the power turntable is disposed on an output end of the power motor;
   the power rod is located on one side of an end face of the power turntable, an eccentric power column is disposed on the end face of the power turntable, and the eccentric power column extends into an inside of a strip-shaped hole formed on the power rod; and
   a guiding hole is formed on the power rod and a guiding rod passing through the guiding hole is disposed on the side wall of the drying box body, the power rod is further connected with end portions of the plurality of external push rod members, and the movable power rod can drive the external push rod members to move along an axis of the adjusting rods.

4. The mineral powder pellet drying device according to claim 3, wherein a side portion of the power rod has an outer extension portion, and two clamping rod members are disposed on the outer extension portion; and each clamping rod member has a clamping roller rotatably connected thereto, one end of each of the external push rod members has an inclined portion, and a plurality of the inclined portions all pass between the two clamping rod members.

5. The mineral powder pellet drying device according to claim 3, wherein a sealing member is disposed on an end face of the material preparation trough facing the inside of the drying box body;

the sealing member comprises a baffle plate, a through-flow orifice and an outer connecting rod; and the baffle plate is in sliding fit with the end surface of the material preparation trough and can cover the feeding port, the through-flow orifice is formed on the baffle plate, one end of the outer connecting rod is connected with the baffle plate, and an other end of the outer connecting rod passes through the side wall of the drying box body and is connected with the power rod.

6. The mineral powder pellet drying device according to claim 1, wherein each of the shunting buffer assembly comprises a supporting mesh member, fixing rods and a rebound supporting member;

the supporting mesh member is in arc shape, two fixing rods are provided and respectively disposed at two sides of the supporting mesh member, and end portions of the fixing rods are fixedly connected with the inner walls of the drying box body;

the rebound supporting member is disposed on a lower side of the supporting mesh member and comprises a lower fixing seat, a supporting cylinder and a supporting rod; and an end portion of the lower fixing seat is fixedly connected with the inner wall of the drying box body, the top end of the supporting rod is fixedly connected with an inner wall of the supporting mesh member, the supporting cylinder is disposed on the lower fixing seat and a lower end of the supporting rod extends into the inside of the supporting cylinder, and the lower end of the supporting rod is connected with an inner wall of the supporting cylinder through a supporting spring.

7. The mineral powder pellet drying device according to claim 1, wherein a partition member is further disposed inside the drying box body, and the partition member divides the drying box body into a heat exchange cavity and a drying cavity;

an exhaust vent that communicates the heat exchange cavity with the drying cavity is formed in a bottom of the partition member;

the hot air blower assembly comprises an air blower, a heating member and a heat exchange air duct;

the air blower is disposed on an outer wall of the drying box body, and the heating member is disposed on the inner wall of the partition member facing the drying cavity; and an air outlet end of the air blower is communicated with the heating member through the heat exchange air duct, and the heat exchange air duct passes through the heat exchange cavity and can exchange heat with an inside of the heat exchange cavity.

8. The mineral powder pellet drying device according to claim 7, wherein air guide holes that communicate the heat exchange cavity with an inside of the material preparation trough are formed on the material preparation trough, and a drying agent located at the exhaust vent is placed inside the heat exchange cavity.

* * * * *